March 25, 1969  R. C. MEDHURST  3,435,103
PROCESS FOR FORMING SOLID ARTICLES FROM EXPANDABLE POLYMER
Filed March 1, 1965
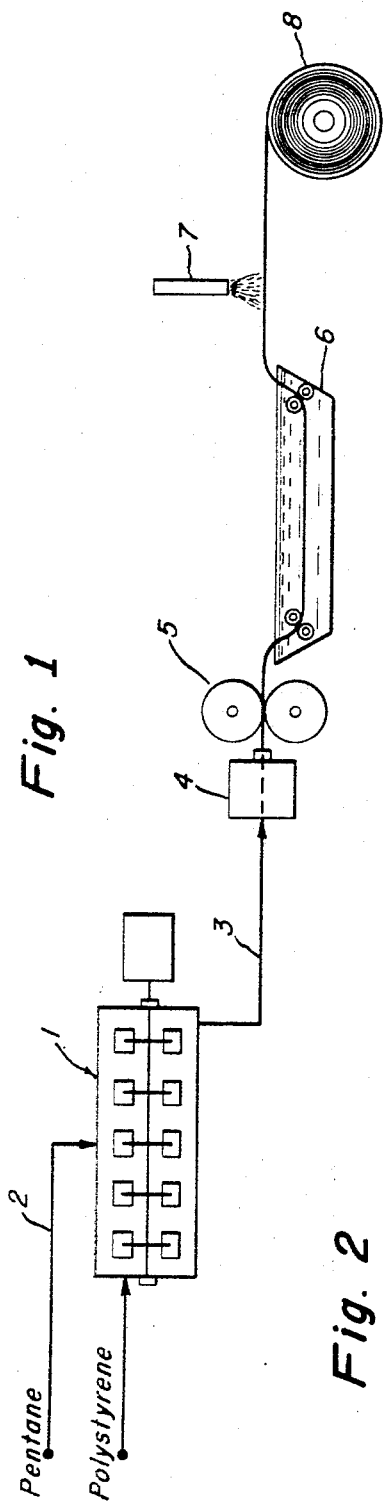
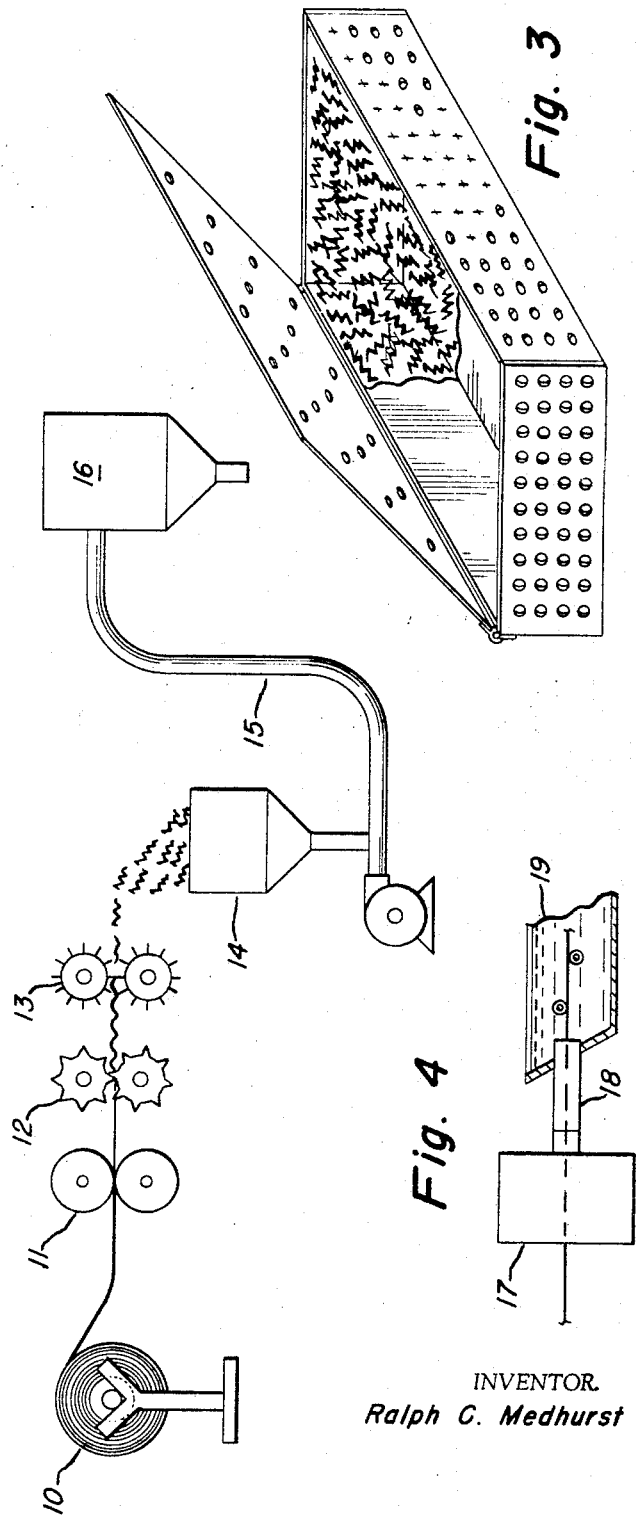
INVENTOR.
Ralph C. Medhurst

United States Patent Office 3,435,103
Patented Mar. 25, 1969

3,435,103
PROCESS FOR FORMING SOLID ARTICLES FROM EXPANDABLE POLYMER
Ralph C. Medhurst, Park Forest, Ill., assignor to Standard Oil Company, Chicago, Ill., a corporation of Indiana
Filed Mar. 1, 1965, Ser. No. 435,944
Int. Cl. B29c *24/00;* B29g *5/00;* B29f *3/00*
U.S. Cl. 264—53         2 Claims

ABSTRACT OF THE DISCLOSURE

A process for preparing foamed articles comprising the steps of extruding an expandable polymer in the form of a substantially unexpanded sheet, slitting the polymer sheet into multiple ribbons, corrugating the ribbons, and expanding the corrugated ribbons by the application of heat.

---

This invention is a process for preparing molded articles in closed molds from expandable polymer, starting from extruded expandable sheet stock of such polymer.

My invention is a process for the preparation of molded articles from expandable polymer which is especially convenient in that the necessity for shipping expandable plastic in unexpanded form and subjecting it to a pre-expansion prior to use, or, alternatively, for shipping an expandable plastic in expanded form or partially-expanded form and incurring thereby additional expense through moving relatively large volumes of low weights of material, is avoided. These and other ojects and advantages of my inventive process will be apparent from the description which follows.

Formed articles of expandable polymers, particularly of expanded polystyrene, are well known. These articles are commonly made from small polymer beads impregnated with an expanding agent, such as the lower aliphatic hydrocarbons, for example, $C_4$ to $C_8$ hydrocarbons or various inorganic expanding agents, such as carbon dioxide affording-substances, nitrogen releasing-compounds, and others well known to the art. The small polymer beads containing the expanding agent are generally not charged directly to molds for finished foam articles, since the articles made by direct charging of unexpanded beads tend to vary in density, being more dense where the beads collect during charging. Consequently, the small polymer beads are often subjected to a partial pre-expansion, in equipment well known to this art, and the partially expanded beads, which either fill or nearly fill the mold, are subjected to thermal treatments of various sorts to cause a final expansion and coalescence of the polymer particles.

Alternatively, the foamable polymer suitable for use in a closed mold foaming process can be excelsior-like in character. Excelsior-like foamable polymer, due to its bulky quality, eliminates the need for a preexpanding step since a given weight of polymer charge will fill or nearly fill the mold. Thus a charge of excelsior-like polymer gives a uniform density throughout the mold whereas a charge of non-preexpanded bead form polymer occupies only the lower portion of the mold. Again, there is a disadvantage in employing such materials in that bulky, non-expanded excelsior-like polymer requires a greater shipping volume than non-expanded beads.

In many instances, the producer of expandable polymer is not the party who converts the polymer into finished expanded articles of commerce, such as ice buckets, cooling chests, helmets and the like. If unexpanded polymer is shipped to the manufacturer of foamed items, that manufacturer, as a matter of simplifying operations, uses a preexpander to enlarge the size of the polymer beads and thus simplify handling and loading of molds in the production of foamed articles. I have devised a process for the preparation of foamed articles from expandable polymer which neither involves a pre-expansion step, with the resultant necessary expenditure for pre-expansion equipment, nor which suffers from the economic disadvantage of shipping bulky-low-density quantities of foamable or pre-foamed polymer. In contrast to procedures heretofore known to the art, my process provides a means for the producer of an expandable polymer to transport such polymer, at minimum cost, to the producer of foamed articles; the latter can then prepare such polymer for use in his molds by means of simple equipment.

My invention, briefly, involves the steps of preparing expandable polymer as flat- non-expanded sheet material, transferring such material in dense unexpanded form to the manufacturer of expanded polymer articles, slitting and crimping the sheet material to convert the sheets into crimped, bulky ribbons suitable for direct introduction into molds for the preparation of expanded polymer articles, and expanding the crimped ribbons by the application of heat. Through the use of my process, the producer of polystyrene is enabled to reduce his shipping costs to the manufacturer of foamed articles to a minimum. Also, the manufacturer of the foamed articles is able to convert the sheet stock to a desirable, usable form with a minimum of equipment investment and inconvenience. My process is especially useful in the treatment of expandable vinyl aromatic polymers, for example, polystyrene, though it is not limited thereto. Polystyrene, because of its favorable price and ease of manufacture, is one of the most popular items for the preparation of foamed articles. Additional polymers which can be produced in expandable forms include such as polyvinyl chloride, polyvinylidene chloride, polyacrylates, polymethacrylates, various copolymers of styrene, such as copolymers with butadiene or other dienes, various graft polymers of styrene such as those with polybutadiene or similar synthetic rubber, as well as other polymers known to this art. The example, presented hereinbelow, of the practice of my invention, describes the invention as applied to a polystyrene. As will be understood by those skilled in the art, the example describes at the same time procedures which can be employed with other expandable polymers with only minor variations in conditions depending upon the properties of the particular polymer employed.

The polymer sheets to be employed in the practice of my invention can vary in thickness from as little as 0.005 to as much as 0.30 inch or more. The sheet must not be so thick that it cracks under the crimping operation of my invention. In the case of the more brittle polymers, modification of the polymer by the inclusion of small amounts of modifying agents imparting the quality of impact resistance may be necessary. Such modifiers are known to this art, and one example of a suitably modified polymer is the so-called impact polystyrene, which is a polystyrene containing from 1 to 6 percent of a polybutadiene or similar material. The width of the sheets can be any width conveniently handled by the sheet extruder available to a manufacturer, but a width of about 18" to 36" is desirable as a matter of convenience. The foaming or expanding agent is conveniently intermixed with the polymer during or immediately following polymerization of monomer, so that it is incorporated in the polymer either while that material is being formed or prior to the first extrusion of the polymer product into a sheet form. Of course, in the case of liquid agents, these can be introduced to the polymer by soaking the polymer sheet in the expansion agent which migrates into the polymer. This is generally a less convenient procedure than incorporation of the expanding agent during polymerization. A number of expanding or foaming agents are known to the art, and are suitable for use in my process. Among these are liquid aliphatic and cycloaliphatic hydrocarbons, such as cyclopentane, cyclohexane, cyclopentadiene, pentane, isopentane, hexane and the like. Because my process involves the extrusion of hot sheet stock, the solid gas-affording foaming agents known to the art, such as inorganic and organic compounds, which release nitrogen or carbon dioxide upon the application of heat, are generally not useful in my process.

The polymer in which the expansion agent has been intimately commingled is extruded into sheet stock of a size described above and this stock is cooled, desirably in a water bath, and either cut into rectangular sheets of convenient size or made into a roll similar to newsprint stock. The rolled stock or the rectangular sheets are packed into cans, drums, or other wrappings which will reduce the loss of the volatile expanding agent from the polymer and in this form are conveniently shipped to the manufacturer of foamed articles.

When the container of dense, non-expanded polymer sheet stock is received by a manufacturer of foamed articles, the sheet material is converted into a form directly usable in the molds for preparation of expanded articles by slitting, crimping and cutting. The slitting device is suitably constructed in the manner of paper and plastic sheet-slitting devices known to the art. The crimping device is simply opposing corrugated rollers, with gently curved or sharp corrugations depending upon the brittleness of the sheet stock. The slitting, crimping and cutting operations can be, if desired, three separate steps or a combination operation in a single device. The crimped ribbons coming from the slitter, corrugated rolls and cutter are then directly charged to the molt for preparation of a foamed article or they can be stored in a feed hopper. If the crimped ribbons have been made from rectangular sheet stock, and the length of such stock is suitable, the cutting operation can be eliminated. In the case of the rolled sheet stock, the cutter is, of course, a necessity rather than an option. When ribbons are cut into longer lengths, say 3 to 6 inches or more, they can be conveniently charged to the molds by hand. If the ribbons are cut into shorter lengths, say 1 to 2 inches, they can be blown into the molds by inclusion in an air stream which carries them through known types of solids transport systems. The corrugations of the corrugated rolls should be smaller than the ribbon lengths, desirably no more than one-third of the length of the cut ribbon, for otherwise the bulkiness afforded to the ribbon material by its crimped nature is lost. The arrangement of the slitting, crimping and cutting devices is not of critical importance, and if desired, the sheet stock can be cut into suitable lengths prior to crimping and slitting. In addition to molded articles, it is also possible to make packing material, suitable for loose packing of fragile articles, by my process. This is readily accomplished by subjecting the aforedescribed crimped ribbons to heat in a relatively non-confining space. Thus, individual ribbons can freely foam or expand to the maximum size possible without coalescence with adjacent ribbons.

The preparation of a molded article according to my invention will be more clearly understood through reference to the following example and the figures of the accompanying drawing.

Referring to FIGURE 1, an impact polystyrene with a molecular weight of about 50,000, and containing about 4 percent of polybutadiene, is introduced to vessel 1, where it is softened by heating to a temperature in the range of 330° F. to 525° F. and converted to a viscous fluid material. Pentane, the expanding agent, is introduced to vessel 1 through line 2 in an amount such that the extruded polymer contains from 3 to 13 percent of pentane, desirably from 5 to 8 percent, and preferably about 6 percent. Vessel 1 is equipped with mixing paddles which distribute the pentane substantially uniformly throughout the viscous polystyrene as it flows from the inlet to outlet line 3. By line 3, the polystyrene, still in a fluid state, is passed to extruder 4. This extruder has on its extruding face a slit or, alternatively, closely spaced orifices, such slit being about 0.24" in width and about 2 feet in length. The temperature at the extruder head should be maintained in the range of 275 to 325° F., preferably at about 300° F. Polymer is extruded from the extruder head at a rate of about 180 pounds per hour, into a sheet about 0.30 inch in finished thickness. The hot extruded sheet is immediately passed between rotating cooled rollers 5, equipped with internal, cooling liquid circulating means to hold the roller temperature near 75° F. Thus, the surface of the sheet is immediately hardened and the loss of appreciable amounts of pentane is prevented by an outer-skin-like surface. These rollers are preferably chrome-plated and highly polished, or coated with a polytetrafluoroethylene, such as "Teflon" to reduce the tendency of the hot extruded polymer to stick to the rollers. The rollers should be placed in extremely close juxtaposition to the extrusion head, and are, desirably, to be movable so that the extruder head gap can be readily adjusted. The extruder head can be tapered so as to inject polymer almost directly between the cooled rollers. The roller surface moves at substantially the speed of the polymer sheet.

Alternatively, the hot extruded sheet can be passed immediately into a water bath for quench cooling, but the gap between the extruder head and the water bath permits a part of the foaming agent to volatilize from the polystyrene prior to cooling. Thus, an excess of pentane must be introduced in vessel 1 and this represents an economic loss in the process.

As another alternative, the apparatus diagrammed in FIGURE 4 can be employed. This involves direct passage of the sheet polymer material from the extruder head to the water bath by way of a polytetrafluoroethylene channel. This channel can be a block of polytetrafluoroethylene which has been provided with a central cavity running from one edge to the other. It can also be two pieces of polytetrafluoroethylene fitted together, face-to-face, with two edges interlocked and their faces spaced apart from each other. The block is desirably equipped with additional cavities not communicating with the polymer channel for the insertion of rod-shaped heating elements, which may be necessary for the warming of polymer during startup of operations. If such cavities are neither desirable nor feasible, the block can be heated with conventional tape heating elements. This polytetrafluoroethylene block provides heat insulation between the water bath and the extrusion head and, because of the pressure it exerts upon the polymer passing through the block, prevents the loss of foaming agent during passage of the polymer from the extrusion head into the water bath.

From the cooled rollers 5, the surface-hardened sheet of polystyrene is passed immediately into a water bath 6, where the sheet is cooled quickly through its entire thickness below 95° F. The polymer sheet is then passed from the water bath through an air blast from vent 7, which drives off entrained water, to a roller 8, upon which the polystyrene sheet is gathered. When a roll of convenient size has been obtained, the sheet is cut and an empty roll substituted for the full roll. The rolled polystyrene, if stored or shipped, is placed in a drum which is fitted with a tightly sealed cover or other vapor-tight wrapping. Shipment in a closed container results in loss of a very small amount of the pentane blowing agent from the polystyrene. Instead of being gathered on a roll, the polystyrene sheet can be cut at this stage, into flat sheet stock, and bundled for shipment or immediately be processed further.

Referring now to FIGURE 2, when it is desired to use the expandable polystyrene prepared according to the described procedure, the roll of polystyrene is removed from its wrappings, if wrapped, and placed in rack 10, which is simply a suitable Y-shaped holding device. From rack 10, the polystyrene sheet is unrolled and passed through slitter 11, where it is converted into strips of 1/16-inch to 3/4-inch, preferably 1/8-inch width. These strips are immediately passed, without separation, into crimping device 12, which comprises corrugated rollers with intermeshing teeth. These rollers convert the ribbons into crimped ribbons which are cut by rotating knife 13 into pieces of about 2 inches in length. These crimped pieces are caught in receiver 14 from which they are blown through conveyor line 15 by an air stream to storage bin 16. From storage bin 16 the particles are removed through a bottom port as needed for the preparation of foamed articles.

Referring now to FIGURE 3, the crimped ribbon can be placed into a mold which is equipped with holes for introduction of steam to contact the ribbons. Foaming can be performed within the range of 200° F. to 570° F. In addition to steam, other heating means are hot air, infrared radiation, hot water, etc. Heating is usually held within the range of 195° F. to 300° F. as a matter of convenience in manipulation. As shown in FIGURE 3, the crimped ribbons fill the mold to its upper edge, though it contains considerable void spaces because of the form of the ribbons. The amount of ribbons added should be generally equal in solid volume to about 8 to 15 percent of the total volume of a finished foamed article. An amount of crimped ribbons equal to the desired weight of the final foamed article is placed in the mold and the whole is subjected to superheated steam, which effects an expansion of the articles and a coalescence of the expanded materials into a unitary mass. The crimped ribbon can also be heated with no confinement to form loose packing material.

Rather than transporting the polystyrene sheet in the form of a roll, it is possible to convert the sheet, as mentioned above, by a suitable cutting device into rectangular sheets which can be stacked and tightly enclosed for shipment. These rectangular sheets can then be fed, one at a time, into a slitting, corrugating and cutting device as described above.

Through the use of the process I have described, it is possible for the manufacturer of expandable polystyrene and the manufacturer of foamed articles to effect considerable savings in shipping, handling and treating costs in the making of foamed articles. The expandable polystyrene is shipped in a form convenient for handling and takes up a minimum volume of shipping space. When the expandable polystyrene has reached its destination, it can be conveniently converted into a material suitable for filling a mold and producing a foamed article without the necessity of pre-expansion in relatively costly pre-expanding devices and without the handling problems inherent in treating small expandable beads. My inventive process has been described in particular as set forth above, but various modifications thereof will be apparent to those of ordinary skill in this art.

Having thus described my invention, what I claim is:

1. A process for the preparation of foamed articles which comprises the following steps:
    (a) extruding an expandable polymer, containing a hydrocarbon foaming agent, in the form of a substantially unexpanded polymer sheet having a thickness of from about 0.005 inch to about 0.30 inch,
    (b) slitting said sheet into multiple ribbons having a width in the range of from about 1/16-inch to about 3/4-inch,
    (c) corrugating said ribbons, and
    (d) expanding said corrugated ribbons by the application of heat.

2. The process of claim 1 wherein said expandable polymer is an impact polystyrene containing from about 1 to about 6 percent of a synthetic rubber.

References Cited

UNITED STATES PATENTS

| | | | |
|---|---|---|---|
| 2,728,950 | 1/1956 | Annesser | 264—147 |
| 2,740,157 | 4/1956 | McCurdy et al. | 264—53 |
| 2,917,806 | 12/1959 | Spence et al. | 264—282 |
| 2,945,261 | 7/1960 | Aykanian et al. | 264—53 |
| 3,012,282 | 12/1961 | Donald | 264—141 |
| 3,033,806 | 5/1962 | Spencer | 264—53 |
| 3,066,382 | 12/1962 | Zweigle et al. | 264—51 XR |
| 3,147,321 | 9/1964 | Oswald et al. | 264—53 |

FOREIGN PATENTS

| | | |
|---|---|---|
| 682,464 | 5/1964 | Canada. |
| 948,300 | 1/1964 | Great Britain. |

JULIUS FROME, *Primary Examiner.*

PHILIP E. ANDERSON, *Assistant Examiner.*

U.S. Cl. X.R.

18—5; 260—2.5; 264—146, 286, 320